United States Patent [19]

Hirama et al.

[11] Patent Number: 5,374,479
[45] Date of Patent: Dec. 20, 1994

[54] MAGNETIC RECORDING MEDIUM COMPRISING 4,5-DICHLORO-2-OCTYL-4-ISOTHIAZO-LINE-3-ONE ANTI MOLD AGENT IN THE MAGNETIC LAYER OR BACKCOAT LAYER

[75] Inventors: Makoto Hirama; Ikuo Matsumoto, both of Mito, Japan

[73] Assignee: Victor Company of Japan, Ltd., Yokohama, Japan

[21] Appl. No.: 896,148

[22] Filed: Jun. 9, 1992

[30] Foreign Application Priority Data

Jun. 11, 1991 [JP] Japan ................................. 3-166360
Jul. 30, 1991 [JP] Japan ................................. 3-212675

[51] Int. Cl.$^5$ ............................................. G11B 5/00
[52] U.S. Cl. .................................. 428/328; 428/425.9; 428/694 BA; 428/694 BB; 428/694 BN; 428/900; 428/907
[58] Field of Search ...................... 428/425.9, 694, 695, 428/900, 907, 694 BA, 694 BB, 694 BN, 328; 514/372

[56] References Cited

U.S. PATENT DOCUMENTS

| | | | |
|---|---|---|---|
| 4,322,475 | 3/1982 | Lewis et al. | 428/411 |
| 4,698,820 | 10/1987 | Mine et al. | 428/425.9 |
| 4,964,892 | 10/1990 | Hsu | 504/138 |

FOREIGN PATENT DOCUMENTS

| | | |
|---|---|---|
| 61-214212 | 9/1986 | Japan . |
| 63-39159 | 2/1988 | Japan . |
| 2-49217 | 2/1990 | Japan . |

*Primary Examiner*—Stevan A. Resan
*Attorney, Agent, or Firm*—Michael N. Meller

[57] ABSTRACT

The present invention provides a magnetic recording medium which can prevent mold from generating in the magnetic medium without degrading physical and electromagnetic conversion characteristics of the magnetic medium. Anti-mold agents specified by chemical formulas (1) through (7) are employed in magnetic layers or over-coat layers which are overlaid on non-magnetic bases.

2 Claims, No Drawings

MAGNETIC RECORDING MEDIUM COMPRISING 4,5-DICHLORO-2-OCTYL-4-ISOTHIAZOLINE-3-ONE ANTI MOLD AGENT IN THE MAGNETIC LAYER OR BACKCOAT LAYER

BACKGROUND OF THE INVENTION

1. Field of the Invention

The present invention relates to improvements of a magnetic recording medium used for a magnetic recording and/or a reproducing apparatus and it particularly relates to a magnetic recording medium employing an anti-mold agent for preventing mold (mildew) from generating in the magnetic medium.

2. Description of the Related Art

Presently, a magnetic recording medium, such as a magnetic tape is constructed by coating a magnetic paint on one side of a non-magnetic base, for instance, a polyester film to form a magnetic layer.

Such magnetic paint generally comprises magnetic particles, abrasive, light blocking agents; binders, for instance, polyvinyl chloride, polyurethane or nitrocellulose; dispersant for promoting dispersion; lubricant for improving tape running characteristic, for instance, fatty acid, fatty ester or silicon oil. The mixture of these materials are kneaded with solvent by a mixer for better dispersion to obtain the magnetic painting. Further, a back coating layer is formed on the other side of the non-magnetic base by coating a carbon black painting for improving the tape running characteristic and the light blocking characteristic.

However, since the additives such as binders and lubricants contained in the magnetic layer (the magnetic painting) or the back coating layer are made of organic compounds, the additives serve as nourishment to mold in the magnetic or the back coating layer. If the mold should adhere to the layers, the magnetic medium may be contaminated by proliferated mold, which may pose a problem of adherence between layers of wound magnetic tape or contamination of a magnetic head which scans the magnetic tape leading to erroneous recording or reproducing of signals.

Japanese Laid Open Patent Application No. 214212/1986 and Japanese Laid Open Patent Application No. 49217/1990 disclose employment of anti-mold agents on the magnetic layers or the back coating layers to prevent mold from generating thereon.

The above magnetic mediums employing the disclosed anti-mold agents indicate anti-mold effects in some degree at initial states, however, it is found that the magnetic mediums lose the anti-mold effects after the magnetic mediums have been repeatedly used.

Further, since the polyurethane and the polyvinyl chloride are liable to generate mold, and the fatty acid is a good nourishment to the mold, the magnetic mediums employing those materials in particular require stronger anti-mold agents.

SUMMARY OF THE INVENTION

Accordingly, a general object of the present invention is to provide a magnetic medium in which the above disadvantages have been eliminated.

A more specific object of the present invention is to provide a magnetic medium which is free from mold and never lose anti-mold effect after repeated use of the magnetic medium.

Another and more specific object of the present invention is to provide a magnetic medium having a magnetic layer or a back coat layer which contain at least one of anti-mold agents specified by following chemical formulas (1) through (7).

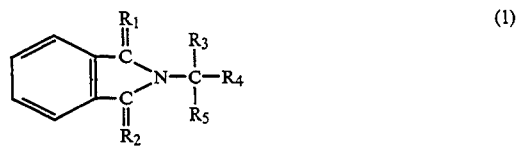
(1)

wherein
each of $R_1$ and $R_2$ is selected from S and O,
each of $R_3$, $R_4$ and $R_5$ is selected from Cl, F, Br, I and H.

(2)

wherein n=10~14

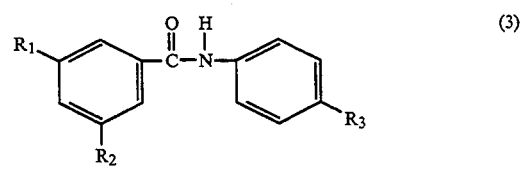
(3)

wherein
each of $R_1$, $R_2$ and $R_3$ is selected from H, Cl, I, F and Br.

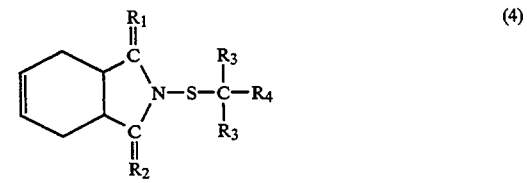
(4)

wherein
each of $R_1$ and $R_2$ is selected from S and O,
each of $R_3$, $R_4$ and $B_5$ is selected from Cl, F, Br, I and H.

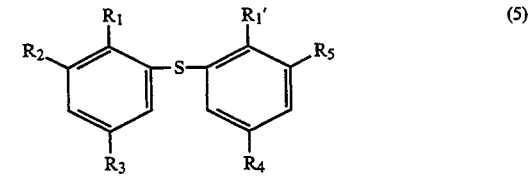
(5)

wherein
each of $R_1$ and $R_2$ is selected from OH, $CH_3$ and H
each of $R_2$, $R_3$, $B_4$ and $R_5$ is selected from Cl, F, Br, I and H.

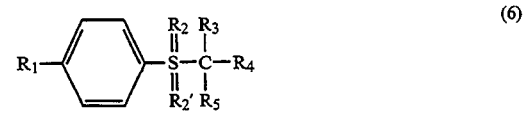
(6)

wherein
$R_1$ is selected from H, Cl, F, I and Br
$R_2$ and $R_2'$ is O each of $R_3$, $R_4$ and $R_5$ is selected from H, Cl, F, Br and I.

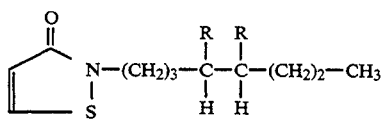

wherein

R is selected from Cl, Br, I and F.

Other objects and further features of the present invention will be apparent from the following detailed description.

DETAILED DESCRIPTION OF THE PREFERRED EMBODIMENT

Description will be given to each of seven embodiments according to the present invention together with Examples and Comparative Examples, respectively.

EMBODIMENT 1

(Example 1)

The composition of a basic magnetic paint was obtained according to TABLE A.

After mixing and blending the ferromagnetic particles (Co-$\beta$-Fe$_2$O$_3$), alumina particles (0.5 $\mu$m) as the abrasive, and the carbon black together with lecithin (1 part by weight) as the dispersant, and methyl ethyl ketone and toluene as a solvent for one hour, the mixture was further added with the polyvinyl chloride and the polyurethane, and blended for another three hours. Then, the mixture were kneaded for ten hours in a grain mill.

TABLE A

| composition | parts by weight |
|---|---|
| ferromagnetic particles (Co-$\gamma$-Fe$_2$O$_3$) | 100 |
| polyvinyl chloride | 10 |
| polyurethane | 10 |
| carbon black | 8 |
| abrasive | 5 |
| fatty acid | 1 |
| fatty acid ester | 1 |
| toluen | 180 |
| methyl ethyle ketone | 180 |
| curing agent | 10 |

The magnetic paint in accordance with Embodiment 1 was obtained by employing an anti-mold agent specified by the chemical formula (8) in an amount of 0.005 parts by weight to the above mixture together with colonate-L(trade name) as the curing agent, myristic acid as the fatty acid, and butyl stearate as the fatty acid ester.

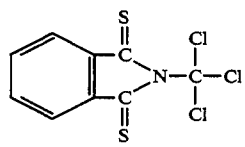

Thus, the magnetic medium of Example 1 as a magnetic tape was obtained through coating processes of the above magnetic paint on a surface of a polyester film as the nonmagnetic base, a drying process, calendering process, curing process and slitting process.

(Example 2)

A magnetic medium was produced as in Example 1 except that 0.005 parts of the anti-mold agent was replaced with 0.05 parts of the anti-mold agent as per the formula (8).

(Example 3)

A magnetic medium was produced as in Example 1 except that 0.005 pacts of the anti-mold agent was replaced with 0.2 parts of the anti-mold agent as per the formula (8).

(Example 4)

A magnetic medium was produced as in Example 1 except that 0.005 parts of the anti-mold agent was replaced with a 1.0 part of the anti-mold agent as per the formula (8).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (8).

(Comparative Example 3)

A magnetic medium was produced as in Example 1 except that 0.005 parts of the anti-mold agent was replaced with 4.000 parts of the anti-mold agent as per the formula (8).

The various evaluation tests for physical and electromagnetic conversion characteristics were conducted on the above Examples and the comparative Examples, as well as the evaluation test for the anti-mold effect conducted according to the Japanese Industrial Standard (JIS) Z 2911-1981, 5.2.

The anti-mold effect, coefficient of kinetic friction (coeff. of k. fric.) as the physical property, S/N of luminarice signal(Y-S/N) and S/N of chrominance signal (C-S/N) as electro-magnetic conversion characteristics of video signal recording and playback are indicated in Table 1, regarding Examples 1 through 4 and Comparative Examples 1 through 3 of Embodiment 1.

TABLE 1

| | anti-mold effectiveness (% surface area occupied with mold) | coeff. of k. fric. | Y-S/N* (db) | C-S/N* (db) |
|---|---|---|---|---|
| Example 1 | minute generation | 0.226 | +1.3 | +0.7 |
| Example 2 | no generation | 0.224 | +1.1 | +0.6 |
| Example 3 | no generation | 0.231 | +1.4 | +0.4 |
| Example 4 | no generation | 0.221 | +0.8 | +0.1 |
| Comparative 1 | 100% generation | 0.285 | +1.2 | +0.5 |
| Comparative 2 | 70% generation | 0.278 | +1.3 | +0.5 |
| Comparative 3 | no generation | 0.225 | +0.1 | −0.3 |

(*relative response referred to those measured on an industrial reference tape)

As is clear from TABLE 1, the mediums of Comparative Example 1 and 2 could not prevent mold from generating on the mediums i.e. the mold generated by 100% of the surface area of Comparative Example 1, and by more than 70% of Comparative Example 2, and they behaved higher coefficients of kinetic friction. The medium of Comparative Example 3 showed a good anti-mold effect and a lower coefficient of kinetic friction, however, the electro-magnetic conversion characteristics (Y-S/N and C-S/N) thereof were degraded. On the other hand, each of Examples 1 through 4 showed a good result in the anti-mold effect, the physical characteristic (coefficient of kinetic friction) and the electro-magnetic characteristics (Y-S/N and C-S/N), compared with Comparative Examples 1 through 3.

EMBODIMENT 2

Magnetic mediums were produced as in Embodiment 1 except that the anti-mold agent was replaced with an anti-mold agent specified by the chemical formula (9).

$$CH_3(CH_2)_{10}CH_2NH_2 \cdot HCL \qquad (9)$$

(Example 1)

The magnetic medium in accordance with Embodiment 2 was obtained by employing an anti-mold agent specified by the chemical formula (9) in an amount of 0.005 parts by weight.

(Example 2)

A magnetic medium was produced as in Example 1 except that 0.005 parts of the anti-mold agent was replaced with 0.05 parts of the anti-mold agent as per the formula (9).

(Example 3)

A magnetic medium was produced as in Example 1 except that 0.005 parts of the anti-mold agent was replaced with 0.2 parts of the anti-mold agent as per the formula (9).

(Example 4)

A magnetic medium was produced as in Example 1 except that 0.005 parts of the anti-mold agent was replaced with a 1.0 part of the anti-mold agent as per the formula (9).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (9).

(Comparative Example 3)

A magnetic medium was produced as in Example 1 except that 0.005 parts of the anti-mold agent was replaced with 4.000 parts of the anti-mold agent as per the formula (9).

The anti-mold effect, output degradation of output signal level after repeated run as electrical characteristics, frequency modulation component out-put (FM-OUT and C-OUT) as the electro-magnetic conversion characteristics in video signals, are indicated in Table 2, of the Examples 1 through 4 and Comparative Examples 1 through 3 of Embodiment 2.

TABLE 2

|  | anti-mold effectiveness (% surface area occupied with mold) | degradation* of output signal level after repeated run (db) | FM-OUT** (db) | C-OUT** (db) |
| --- | --- | --- | --- | --- |
| Example 1 | minute generation | −2.8 | +0.1 | +0.0 |
| Example 2 | no generation | −2.2 | +0.2 | +0.1 |
| Example 3 | no generation | −2.5 | +0.1 | +0.1 |
| Example 4 | no generation | −2.3 | +0.1 | +0.0 |
| Comparative 1 | 100% generation | −3.5 | +0.0 | +0.0 |
| Comparative 2 | 70% generation | −3.7 | +0.0 | +0.1 |
| Comparative 3 | no generation | −2.2 | −1.1 | −0.8 |

(*Initial playback output is regarded as 0db)
(**relative response referred to those measured on an industry reference tape)

As is clear from TABLE 2, the mediums of Comparative Example 1 and 2 could not prevent mold from generating on the mediums i.e. the mold generated by 100% of the surface area of Comparative Example 1, and by more than 70% Comparative Example 2, and they showed higher output degradation. The medium of Comparative Example 3 showed a good anti-mold effect and lower output degradation, however, the electro-magnetic conversion characteristics (FM-OUT and C-OUT) thereof were degraded. On the other hand, each of Examples 1 through 4 showed a good result in the anti-mold effect, and the electro-magnetic conversion characteristics (FM-OUT and C-OUT), compared with Comparative Examples 1 through 3.

EMBODIMENT 3

Magnetic mediums were produced as in Embodiment 1 except that the anti-mold agent was replaced with an anti-mold agent specified by the chemical formula (10).

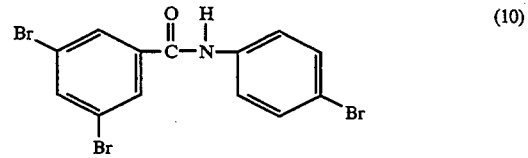

(Example 1)

The magnetic medium in accordance with Embodiment 3 was obtained by employing an anti-mold agent specified by the chemical formula (10) in an amount of 0.005 parts by weight.

(Example 2)

A magnetic medium was produced as in Example 1 except that 0.005 parts of the anti-mold agent was replaced with 0.05 parts of the anti-mold agent as per the formula (10).

(Example 3)

A magnetic medium was produced as in Example 1 except that 0.005 parts of the anti-mold agent was replaced with 0.2 parts of the anti-mold agent as per the formula (10).

(Example 4)

A magnetic medium was produced as in Example 1 except that 0.005 parts of the anti-mold agent was replaced with 1.0 part of the anti-mold agent as per the formula (10).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (10).

(Comparative Example 3)

A magnetic medium was produced as in Example 1 except that 0.005 parts of the anti-mold agent was replaced with 4.000 parts of the anti-mold agent as per the formula (10).

The anti-mold effect, edge damage of tape by running tests, S/N of luminance signal (Y-S/N) and S/N of chrominace signal (C-S/N) characteristics, are indicated in Table 3, of Examples 1 through 4 and Comparative Examples 1 through 3 of Embodiment 3.

TABLE 3

| | anti-mold effectiveness (% surface area occupied with mold) | edge damage of tape by running (pass) | Y-S/N* (db) | C-S/N* (db) |
| --- | --- | --- | --- | --- |
| Example 1 | minute generation | 360 | +0.1 | +0.1 |
| Example 2 | no generation | 420 | +0.2 | +0.0 |
| Example 3 | no generation | 380 | +0.1 | +0.2 |
| Example 4 | no generation | 410 | +0.0 | +0.1 |
| Comparative 1 | 100% generation | 230 | +0.0 | +0.0 |
| Comparative 2 | 70% generation | 320 | +0.0 | +0.1 |
| Comparative 3 | no generation | 400 | −1.2 | −1.4 |

(*refer to Table 1)

As is clear from TABLE 3, the mediums of Comparative Example 1 and 2 could not prevent mold from generating on the mediums, i.e. the mold generated by 100% of the surface area of Comparative Example 1, and by more than 70% of Comparative Example 2, and they suffered from edge damage of tape by fewer repeated runs. The medium of Comparative Example 3 showed a good anti-mold effect and, suffered less edge damage of the tapes, however, the electro-magnetic conversion characteristics (Y-S/N and C-S/N) thereof were degraded. On the other hand, each of Examples 1 through 4 showed a good result in the anti-mold effect, the edge damage test and the electro-magnetic conversion characteristics (Y-S/N and C-S/N), compared with Comparative Examples 1 through 3.

EMBODIMENT 4

Magnetic mediums were produced as in Embodiment 1 except that the anti-mold agent was replaced with an anti-mold agent specified by the chemical formula (11).

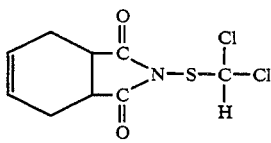

(11)

(Example 1)

The magnetic medium in accordance with Embodiment 4 was obtained by employing the anti-mold agent specified by the chemical formula (11) in an amount of 0.005 parts by weight.

(Example 2)

A magnetic medium was produced as in Example 1 except that 0.005 parts of the anti-mold agent was replaced with 0.05 parts of the anti-mold agent as per the formula (11).

(Example 3)

A magnetic medium was produced as in Example 1 except that 0.005 parts of the anti-mold agent was replaced with 0.2 parts of the anti-mold agent as per the formula (11).

(Example 4)

A magnetic medium was produced as in Example 1 except that 0.005 parts of the anti-mold agent was replaced with a 1.0 part of the anti-mold agent as per the formula (11).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (11).

(Comparative Example 3)

A magnetic medium was produced as in Example 1 except that 0.005 parts of the anti-mold agent was replaced with 5.000 parts of the anti-mold agent as per the formula (11).

The anti-mold effect, jitter characteristic, S/N of luminance signal (Y-S/N) and S/N of chrominance signal (C-S/N) characteristics are indicated in Table 4, of Examples 1 through 4 and Comparative Examples 1 through 3 of Embodiment 4.

TABLE 4

|  | anti-mold effectiveness (% surface area occupied with mold) | jitter ($\mu s$) | Y-S/N* (db) | C-S/N* (db) |
| --- | --- | --- | --- | --- |
| Example 1 | minute generation | 0.076 | +0.0 | +0.2 |
| Example 2 | no generation | 0.077 | +0.2 | +0.1 |
| Example 3 | no generation | 0.081 | +0.1 | +0.0 |
| Example 4 | no generation | 0.078 | +0.2 | +0.1 |
| Comparative 1 | 100% generation | 0.105 | +0.0 | +0.0 |
| Comparative 2 | 70% generation | 0.098 | +0.2 | +0.1 |
| Comparative 3 | no generation | 0.076 | −0.8 | −0.7 |

(*refer to Table 1)

As is clear from TABLE 4, the mediums of Comparative Example 1 and 2 could not prevent mold from generating on the mediums, i.e. the mold generated by 100% of the surface area of Comparative Example 1, and by more than 70% of Comparative Example 2 and they exhibited larger jitter values. The medium of Comparative Example 3 showed a good anti-mold effect, however, the electro-magnetic conversion characteristics (Y-S/N and C-S/N) thereof were degraded. On the other hand, each of Examples 1 through 4 showed a good result in the anti-mold effect, the jitter characteristic and the electro-magnetic conversion characteristics (Y-S/N and C-S/N), compared with Comparative Examples 1 through 3.

EMBODIMENT 5

Magnetic mediums were produced as in Embodiment 1 except that the anti-mold agent was replaced with an anti-mold agent specified by the chemical formula (12).

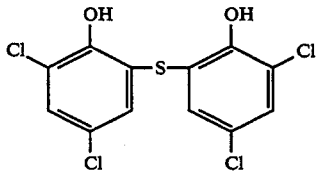

(12)

(Example 1)

The magnetic medium in accordance with Embodiment 5 was obtained by employing the anti-mold agent specified by the chemical formula (12) in an amount of 0.005 parts by weight.

(Example 2)

A magnetic medium was produced as in Example 1 except that 0.005 parts of the anti-mold agent was replaced with 0.05 parts of the anti-mold agent as per the formula (12).

(Example 3)

A magnetic medium was produced as in Example 1 except that 0.005 parts of the anti-mold agent was replaced with 0.2 parts of the anti-mold agent as per the formula (12).

(Example 4)

A magnetic medium was produced as in Example 1 except that 0.005 parts of the anti-mold agent was replaced with a 1.0 part of the anti-mold agent as per the formula (12).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (12).

(Comparative Example 3)

A magnetic medium was produced as in Example 1 except that 0.005 parts of the anti-mold agent was replaced with 4.000 parts of the anti-mold agent as per the formula (12).

The anti-mold effect, scratches on the base film after running. FM-OUT and C-OUT characteristics are indicated in Table 5, of Examples 1 through 4 and Comparative Examples 1 through 3 of Embodiment 5.

TABLE 5

|  | anti-mold effectiveness (% surface area occupied with mold) | scratches on base film after running | FM-OUT* (db) | C-OUT* (db) |
| --- | --- | --- | --- | --- |
| Example 1 | minute generation | moderate | +0.0 | +0.2 |
| Example 2 | no generation | minor | +0.0 | +0.1 |
| Example 3 | no generation | minor | +0.2 | +0.1 |
| Example 4 | no generation | minor | +0.1 | +0.0 |
| Comparative 1 | 100% generation | moderate | +0.0 | +0.0 |
| Comparative 2 | 70% generation | moderate | +0.1 | +0.0 |
| Comparative 3 | no generation | minor | −0.9 | −0.6 |

(*refer to Table 2)

As is clear from TABLE 5, the mediums of Comparative Example 1 and 2 could not prevent mold from generating on the mediums, i.e. the mold generated by 100% of the surface area of Comparative Example 1, and by more than 70% of Comparative Example 2. The medium of Comparative Example 3 showed a good anti-mold effect, however, the electromagnetic conversion characteristics (FM-OUT and C-OUT) thereof were degraded. On the other hand, each of Examples 1 through 4 showed a good result in the anti-mold effect, and the electro-magnetic conversion characteristics (FM-OUT and C-OUT), compared with Comparative Examples 1 through 3.

EMBODIMENT 6

Magnetic mediums were produced as in Embodiment 1 except that the anti-mold agent was replaced with an anti-mold agent specified by the chemical formula (13).

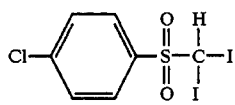

(Example 1)

The magnetic medium in accordance with Embodiment 6 was obtained by employing the anti-mold agent specified by the chemical formula (13) in an amount of 0.005 parts by weight.

(Example 2)

A magnetic medium was produced as in Example 1 except that 0.005 parts of the anti-mold agent was replaced with 0.05 parts of the anti-mold agent as per the formula (13).

(Example 3)

A magnetic medium was produced as in Example 1 except that 0.005 parts of the anti-mold agent was replaced with 0.2 parts of the anti-mold agent as per the formula (13).

(Example 4)

A magnetic medium was produced as in Example 1 except that 0.005 parts of the anti-mold agent was replaced with a 1.0 part of the anti-mold agent as per the formula (13).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (13).

(Comparative Example 3)

A magnetic medium was produced as in Example 1 except that 0.005 parts of the anti-mold agent was replaced with 6.000 parts of the anti-mold agent as per the formula (13).

The anti-mold effect, coefficients of kinetic friction, FM-OUT and C-OUT characteristics are indicated in Table 6, of Examples 1 through 4 and Comparative Examples 1 through 3 of Embodiment 6.

TABLE 6

|  | anti-mold effectiveness (% surface area occupied with mold) | coeff. of k. fric. | FM-OUT* (db) | C-OUT* (db) |
| --- | --- | --- | --- | --- |
| Example 1 | minute generation | 0.288 | +0.1 | +0.1 |
| Example 2 | no generation | 0.276 | +0.2 | +0.2 |
| Example 3 | no generation | 0.282 | +0.0 | +0.1 |
| Example 4 | no generation | 0.279 | +0.0 | +0.0 |
| Comparative 1 | 100% generation | 0.335 | +0.0 | +0.0 |
| Comparative 2 | 70% generation | 0.326 | +0.0 | +0.1 |
| Comparative 3 | no generation | 0.265 | −1.8 | −1.6 |

(*refer to Table 2)

As is clear from TABLE 6, the mediums of Comparative Example 1 and 2 could not prevent mold from generating on the mediums, i.e. the mold generated by 100% of the surface area of Comparative Example 1, and by more than 70% of Comparative Example 2, and they behaved higher coefficients of kinetic friction. The medium of Comparative Example 3 showed a good anti-mold effect and a lower coefficient of kinetic friction, however, the electromagnetic conversion characteristics (FM-OUT and C-OUT) thereof were degraded. On the other hand, each of Examples 1 through 4 showed a good result in the anti-mold effect, the physical characteristic (coefficient of kinetic friction) and the electro-magnetic conversion characteristics (FM-OUT and C-OUT), compared with Comparative Examples 1 through 3.

EMBODIMENT 7

Magnetic mediums were produced as in Embodiment 1 except that the anti-mold agent was replaced with an anti-mold agent specified by the chemical formula (14).

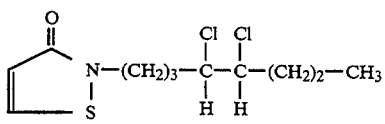

(4,5-dichloro-2-octyl-4-isothiazoline-3-one)

(Example 1)

The magnetic medium in accordance with Embodiment 3 was obtained by employing the anti-mold agent specified by the chemical formula (14) in an amount of 0.005 parts by weight.

(Example 2)

A magnetic medium was produced as in Example 1 except that 0.005 parts of the anti-mold agent was replaced with 0.05 parts of the anti-mold agent as per the formula (14).

(Example 3)

A magnetic medium was produced as in Example 1 except that 0.005 parts of the anti-mold agent was replaced with 0.2 parts of the anti-mold agent as per the formula (14).

(Example 4)

A magnetic medium was produced as in Example 1 except that 0.005 parts of the anti-mold agent was replaced with a 1.0 part of the anti-mold agent as per the formula (14).

(Comparative Example 1)

A magnetic medium was produced as in Example 1 except that the anti-mold agent was not employed.

(Comparative Example 2)

A magnetic medium was produced as in Example 1 except that 0.005 parts of the anti-mold agent was replaced with 0.002 parts of the anti-mold agent as per the formula (14).

(Comparative Example 3)

A magnetic medium was produced as in Example 1 except that 0.005 parts of the anti-mold agent was replaced with 4.000 parts of the anti-mold agent as per the formula (14).

The anti-mold effect, peel strength characteristics, Y-S/N and C-S/N characteristics are indicated in Table 7. of Examples 1 through 4 and Comparative Examples 1 through 3 of Embodiment 7.

TABLE 7

|  | anti-mold effectiveness (% surface area occupied with mold) | peel strength (g) | Y-S/N* (db) | C-S/N* (db) |
| --- | --- | --- | --- | --- |
| Example 1 | minute generation | 36 | +1.2 | +0.7 |
| Example 2 | no generation | 46 | +1.3 | +0.6 |
| Example 3 | no generation | 45 | +1.1 | +0.4 |
| Example 4 | no generation | 48 | +0.8 | +0.2 |
| Comparative 1 | 100% generation | 35 | +1.3 | +0.5 |
| Comparative 2 | 80% generation | 37 | +1.3 | +0.5 |
| Comparative 3 | no generation | 48 | +0.2 | −0.1 |

(*refer to Table 1)

As is clear from TABLE 7, the mediums of Comparative Example 1 and 2 could not prevent mold from generating on the mediums, i.e. the mold generated by 100% of the surface area of Comparative Example 1, and by more than 80% of Comparative Example 2, and they exhibited lower peel strength values. The medium of Comparative Example 3 showed a good anti-mold effect and a higher peel strength value, however, the electro-magnetic conversion characteristics (Y-S/N and C-S/N) thereof were degraded. On the other hand, each of Examples 1 through 4 showed a good result in the anti-mold effect, the physical characteristic (peel strength) and the electro-magnetic conversion characteristics (FM-OUT and C-OUT), compared with Comparative Examples 1 through 3.

According to the present invention, the magnetic mediums employing one of the anti-mold agents of embodiments 1 through 7, in particular from 0.005 to 2.0 parts by weight, can prevent mold from generating in the magnetic mediums without degrading electro-magnetic conversion characteristics and physical characteristics of the magnetic mediums.

In the foregoing embodiments, the anti-mold agents are only employed in the magnetic layer of the magnetic mediums, however, they can also be employed on the back coat layer of the tape.

The magnetic particles, one of components employed for the present invention, can be any kind of ferromagnetic materials. Further, other components such as binders, dispersants, lubricants, abrasives and optical blocking agents, any kind of materials can be employed without affecting the anti-mold performance.

What is claimed is:

1. A magnetic recording medium used for a magnetic recording and/or reproducing apparatus comprising:
   a non-magnetic base;
   a magnetic layer overlaid on one surface of said non-magnetic base, said magnetic layer comprising a mixture of magnetic particles and an anti-mold agent of the formula (7):

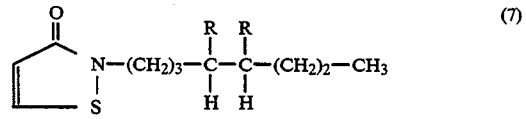

wherein
R is Cl.

2. A magnetic recording medium used for a magnetic recording and/or reproducing apparatus comprising:
   a non-magnetic base;
   a magnetic layer overlaid on one surface of said non-magnetic base; and
   a back coating layer overlaid on the other surface of said non-magnetic medium, said back coating layer also including an anti-mold agent of the formula (7):

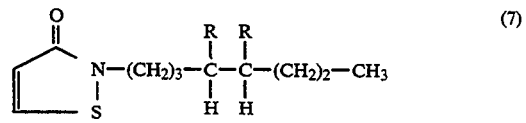

wherein
R is Cl.

* * * * *